United States Patent
Tao et al.

[11] Patent Number: 6,069,631
[45] Date of Patent: May 30, 2000

[54] CODING OF FACIAL ANIMATION PARAMETERS (FAPS) FOR TRANSMISSION OF SYNTHETIC TALKING HEAD VIDEO OVER BAND LIMITED CHANNELS

[75] Inventors: Hai Tao, Champaign; Thomas S. Huang, Urbana, both of Ill.; Homer H. Chen, Thousand Oaks; Wei Wu, Newbury Park, both of Calif.

[73] Assignee: Rockwell Science Center, LLC, Thousand Oaks, Calif.

[21] Appl. No.: 09/007,978

[22] Filed: Jan. 16, 1998

Related U.S. Application Data

[63] Continuation-in-part of application No. 08/799,818, Feb. 13, 1997, Pat. No. 5,818,463.

[51] Int. Cl.$^7$ .................................................. G06F 15/00
[52] U.S. Cl. .................................................. 345/418
[58] Field of Search ................................ 345/418, 419, 345/473, 474, 475, 113, 115

[56] References Cited

U.S. PATENT DOCUMENTS

| | | | |
|---|---|---|---|
| 5,613,056 | 3/1997 | Gasper et al. | 395/173 |
| 5,761,401 | 6/1998 | Kobayashi et al. | 345/430 |

OTHER PUBLICATIONS

Parke and Waters, *Computer Facial Animation*, A K Peters, Wellesley, Massachusetts, 1996, pp. 105–126, 144–147 and 234–237.

Hai Tao et al. "Technical Description of UIUC/Rockwell MPEG–4 SNHC Proposal", M1239, ISO/IEC JTC1/SC29/WG11, Sep. 1996, pp. 1–13.

Eric Petajan et al. "Face and body definition and animation parameters" N1365 ISO/IEC JTC1/SC29/WG11, Oct. 1996, pp. 1–23.

*Primary Examiner*—Phu K. Nguyen
*Attorney, Agent, or Firm*—Koppel & Jacobs

[57] ABSTRACT

A FAP coding technique that realizes enough coding gain to transmit multiple synthetic talking heads over a band limited channel without introducing perceptible artifacts into the reconstructed synthetic talking heads. This is accomplished by exploiting the spatial correlation of each FAP frame and/or the temporal correlation of the sequence of FAP frames. To remove intra-frame correlation, each FAP frame is transformed prior to segmentation from the n-dimensional space into an m-dimensional subspace where m<n using an energy compaction transform. To remove inter-frame redundancy, the sequence is segmented and each parameter vector is transform coded to decorrelate the vector.

22 Claims, 3 Drawing Sheets

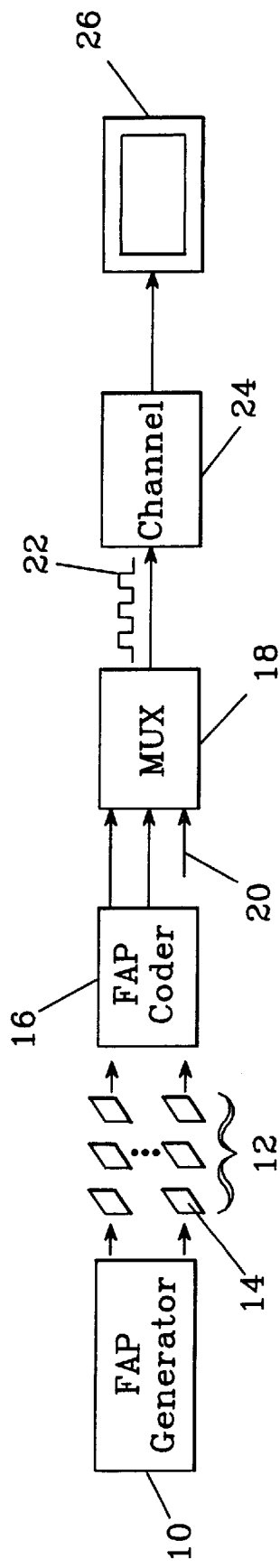
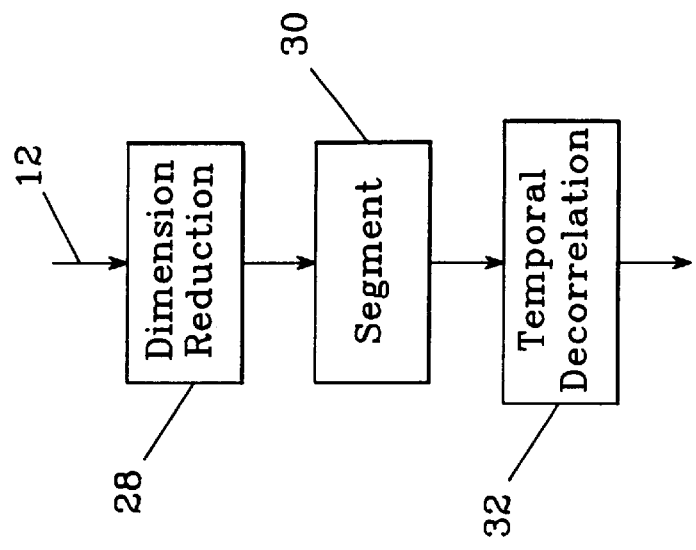
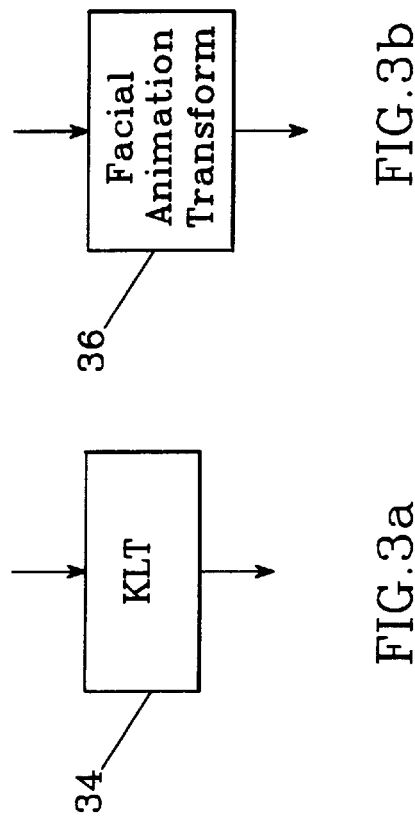

CODING OF FACIAL ANIMATION PARAMETERS (FAPS) FOR TRANSMISSION OF SYNTHETIC TALKING HEAD VIDEO OVER BAND LIMITED CHANNELS

RELATED APPLICATION

This application is a continuation-in-part of application Ser. No. 08/799,818 filed Feb. 13, 1997 now U.S. Pat. No. 5,818,463, entitled "DATA COMPRESSION FOR ANIMATED THREE DIMENSIONAL OBJECTS" and assigned to Rockwell Science Center, Inc.

BACKGROUND OF THE INVENTION

1. Field of the Invention

This invention relates to coding of FAPs for synthetic "talking head" video and more specifically to spatial and/or temporal transform coding of FAPs that allows the simultaneous transmission of multiple synthetic talking head sequences over a band limited channel.

2. Description of the Related Art

The existing and developing Motion Picture Expert Group (MPEG) standards provide techniques for coding and transmitting natural digital video signals over band limited channels. Natural video has a very high bandwidth and thus must be compressed. The basic approach is to perform a motion-compensated prediction on adjacent frames to reduce temporal redundancy and then a two-dimensional discrete cosine transform (DCT) on 8×8 pixel blocks representing the prediction error in each frame to reduce the spatial redundancy. This lossy approach realizes significant coding gain, on the order of 30:1, with minimal visual artifacts.

The MPEG-4 standard under development will also include the capability to generate and transmit synthetic "talking head" video for use in multimedia communication systems. The new standard will include a facial animation parameter (FAP) set that is defined based on the study of minimal facial actions and is closely related to muscle actions. The FAP set enables model-based coding of natural or synthetic talking head sequences and allow intelligible reproduction of facial expressions, emotions and speech pronunciations at the receiver. Currently, the FAP set contains 68 parameters that define the shape deformation or movements of a face. For example, the parameter open_jaw defines the displacement of the jaw in the vertical direction while the parameter head_yaw specifies the rotational yaw angle of the head from the top of the spine. All the FAPs are defined with respect to a neutral face and expressed in a local coordinate system fixed on the face. Many different encoding architectures can be designed to generate the FAP set, which will constitute the majority of the transmitted data.

Channel capacity, which is limited by modem capabilities, is currently 33.4 kbits per second for the plain old telephone services (POTS). Some state-of-the-art modems provide 56 kbits/sec downstream capability from a central location to a home but only 33.4 kbits/sec upstream. Since the 68 FAPs represented by 10 bits at a 30 Hz video rate require only 20.4 kbits/sec, it is possible to transmit them uncoded and thus preserve their visual quality. However, this approach has not contemplated nor will it support the simultaneous transmission of multiple talking heads as part of a single video signal as may occur in a virtual meeting, for example, or the transmission of the FAPs as part of larger synthetic objects, for example, full-body animation.

SUMMARY OF THE INVENTION

In view of the above problems, the present invention provides for transform based coding of FAPs that provides enough coding gain to transmit multiple talking heads over a band limited channel without introducing perceptible artifacts into the reconstructed video.

This is accomplished by exploiting the spatial correlation of each FAP frame and/or the temporal correlation of the sequence of FAP frames. To remove intra-frame correlation, each FAP frame is transformed from the n-dimensional space into an m-dimensional subspace where m<n using an energy compaction transform. The Karhunen Loeve Transform (KLT), which maps the FAP vector onto a set of orthogonal basis function, optimizes the coding gain of the dimension reduction stage. However, a transform which maps the FAP vector onto a set of basis functions such as the Actions Units (Aus) of the Facial Action Coding System (FACS) that, although non-orthogonal, have physical meaning in the context of the synthetic video signal can also be used. Although sub-optimal these types of transforms may be less complex.

To remove inter-frame redundancy, the sequence is segmented and each dimension or parameter vector of the block is transform coded. In a preferred embodiment, a block-to-block prediction technique is used to code each vector's DC transform coefficient. The vectors' AC transform coefficients in the current block are quantized and the zero valued coefficients are run-length coded separately. The vectors' quantized DC and AC coefficients and run-length codes are entropy coded and then multiplexed into a bitstream.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 1 is a block diagram of a system for generating and coding multiple synthetic talking head sequences and transmitting them over a band limited channel to a local site;

FIG. 2 is a flow chart illustrating the method of coding FAPs for each talking head in accordance with the present invention;

FIGS. 3a and 3b are flow charts of alternate dimension reduction transforms for the FAP coder;

DETAILED DESCRIPTION OF THE INVENTION

Figure 4:
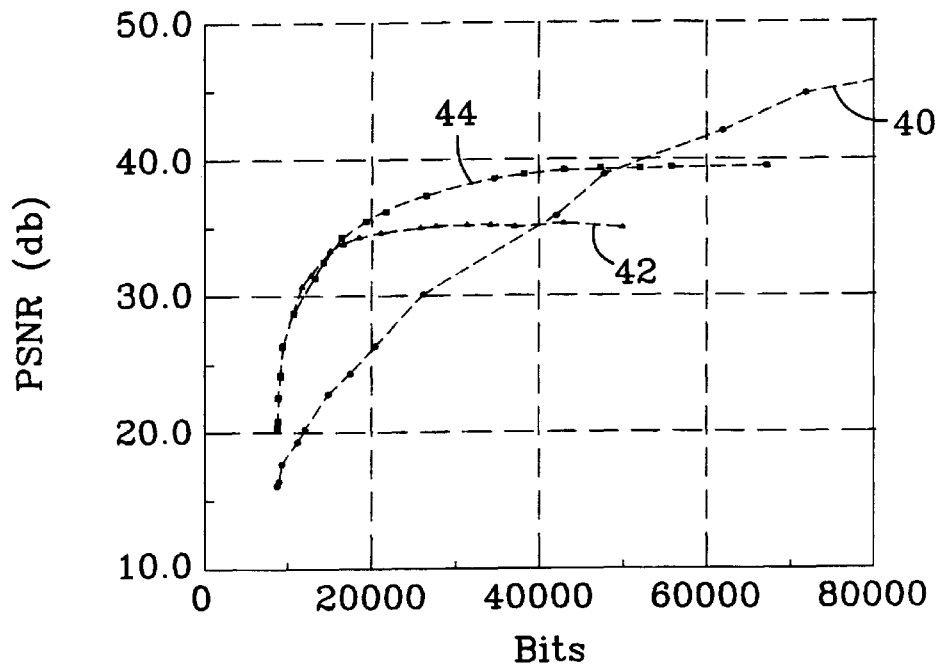
FIG. 4 is a plot illustrating the coding gain associated with using the KLT to achieve dimension reduction when coding FAPs.

The present invention provides a FAP coding technique that produces enough coding gain to facilitate the simultaneous transmission of multiple synthetic talking heads over a band limited channel without noticeably degrading the visual quality of the reconstructed video. Coding gain can be achieved by a) removing the spatial or temporal redundancy so that bits are not wasted coding the same information twice and b) reducing the quality of the reconstructed video, measured in terms of SNR or perceptual quality. The FAP coding technique exploits the first source of coding gain by using transform algorithms that reduce the dimension of the FAPs and/or compact the segmented sequence into a few non-zero coefficients. Although the perceptual quality of the reconstructed video for multimedia systems must remain very high, the second source of coding gain can be exploited through quantization of the DCT coefficients and/or prediction errors As shown in FIG. 1, a synthetic image generator 10 generates one or more FAP sequences 12 that represent different synthetic talking heads; animated or natural. Currently, 68 different facial features or parameters, represented as 10 bit words, are generated at a rate of 30 Hz based upon an underlying face model to produce each successive FAP frame 14 in sequence 12. Alternately, the 68 facial features can be divided into groups, e.g. mouth, eyes, nose, etc. A FAP coder 16 uses transform coding algorithms to reduce the FAPs' intra-frame spatial and/or inter-frame temporal redundancy and code each sequence separately. A multiplexer 18 multiplexes the coded FAPs with other encoded data 20 such as underlying facial models, background, texture, audio tracks into an audiovisual bitstream 22.

FAP coder 16 provides enough coding gain that several talking heads can be combined and simultaneously transmitted in bitstream 22 over a band limited channel 24 to a local site 26 where the video signal is reconstructed for viewing. In a typical application, the uncoded bit rate of any one FAP sequence may be less than the bandwidth of channel 24 but the total uncoded bandwidth would exceed the channel bandwidth. FAP coder 16 reduces the total bandwidth of the video bitstream so that it is less than the channel bandwidth.

Unlike uncoded data or predictive codes, the transform coder exhibits a coding latency because the transform is applied after all the temporal frames are available to the coder. For an L-point DCT, for example, the coding latency is L-1 frames. Hence, this coding method might not be suitable for applications such as two-way conversational telecommunication services if the minimal delay allowed is less than the coding latency introduced by the transform coder. However, in other applications such as broadcasting services where data transmission is only one-way, or video email where the data is first downloaded and stored at the local site, a small coding latency is not as critical as the coding gain requirement. Despite the coding latency, it should be noted that the transform coder does not introduce decoding latency.

As shown in FIG. 2, FAP coder 16 provides the necessary coding gain by exploiting the intra-frame spatial correlation and/or inter-frame temporal correlation of each FAP sequence 12. To reduce intra-frame spatial correlation, each FAP frame is transformed from its n-dimensional space, where n is the number of parameters, to an m-dimensional subspace where m<n using an appropriately selected transform code that fits the structure of the underlying data (step 28).

In general, the transform coder will decorrelate, or significantly reduce the correlation of, the parameters in the FAP frame by projecting them onto a set of basis functions and then quantize the coefficients of the basis functions. This compacts the vast majority of the information into a relatively few, e.g. m, transform coefficients. As a result, the FAP frame can be reconstructed with minimal error based only upon the m coefficients. Coding gain is realized because there are typically far fewer parameters or coefficients to transmit.

Additional coding gain may be achieved by first subdividing the sequence of FAP frames into a plurality of subsequences corresponding to different groups of FAPs that exhibit strong local spatial correlation such as the mouth, eyes, global head motion, etc. and representing each group with its own sequence. As a result, the dimension reduction transforms can be tailored to the characteristics of the respective groups thereby improving the overall spatial reduction.

To reduce inter-frame temporal correlation, the sequence of transformed frames is segmented (step 30) into length L blocks of transform frames to define an L-dimensional subspace over which each of the length L parameter vectors exhibit significant inter-frame temporal correlation. The first parameter vector includes L time samples of the first transform parameter, the second parameter vector includes L time samples of the second transform parameter and so forth.

Once segmented, each parameter vector is transform coded (step 32) to remove or substantially reduce its temporal correlation and compact the energy into a relatively few coefficients. In theory, a KLT could be developed, one for each transform parameter if so desired, to remove temporal redundancy. However, experience has shown that the DCT performs as well as the KLT on temporal data and can be computed using fast techniques not available for the KLT.

Alternate dimension reduction transforms are depicted in FIGS. 3a and 3b. The KLT 34 is based upon principal component analysis, which is a clustering approach used in pattern recognition. The KLT, which is computed from a wide variety of training data, on average diagonalizes the covariance matrix of the FAP frames such that the eigenvectors of the covariance matrix are orthogonal to each other and span a transform space. The eigenvalues are ordered by decreasing variance and represent the energy distribution of the parameters along each coordinate axis in the space.

Dimension reduction is achieved by extracting the m eigenvectors corresponding to the largest eigenvalues to form a subspace. Projection of the original FAPs into this subspace retains most of the information carried in the original FAPs while providing significant coding gain. The KLT is optimal in the sense that it provides maximum signal compaction. For example, in a typical synthetic talking head video sequence, the 68 element FAP frame can be reduced into 3, 4 and 5 components while retaining 89%, 95% and 98% of the signal energy, respectively. By first dividing the FAP frame into localized groups such as eyes, mouth and global head movement, the amount of retained signal energy can be increased for the same number of components. Empirical observations, both objective and subjective, of coded talking head sequences have been taken to select the desired groupings and the number of principle components to be used for all talking head sequences. Although optimal, the generation of the KLT matrix is an extensive process and there are no known fast computation techniques for performing the transform.

Dimension reduction may also be accomplished using a facial animation transform 36 whose basis functions have physical meaning in the context of the synthetic video signal. Although non-orthogonal and thus mathematically suboptimal, the coefficients of the basis functions tend to mimic the smooth motion of the human face. One approach is to select a subset of the 46 FACS' action units (AUs) described in Parke and Waters, *Computer Facial Animation,* A K Peters, Wellesley, Mass., 1996, pp. 105–126, 144–147 and 234–237 such as the upper lip raiser (AU 10) and the chin raiser (AU 17) to define the basis functions of the transform. Alternately, groups of AUs can be selected to represent the localized mouth, eye and/or global head movement parameters.

While each FAP specifies the movement of a specific facial feature point, each action unit describes a visually distinguishable facial movement and is based on a number of facial feature points. The selected AUs define the basis functions of the desired transform space so that each input FAP frame can be approximated by a linear combination of the selected Aus. The coefficients of the basis functions, which can be found by a least-squares minimization, are then quantized and transmitted to the decoder.

The coding gain associated with dimension reduction, and particularly the KLT, is illustrated in FIG. 4. For purposes of comparison, the response curve 40 for a synthetic talking head sequence using the predictive coding algorithm described in the parent application, Ser. No. 08/799,818 filed Feb. 13, 1997 and entitled "DATA COMPRESSION FOR ANIMATED THREE DIMENSIONAL OBJECTS," is provided. Response curves 42 and 44 illustrate the performance enhancement achieved by using KLTs that reduce the dimensionality of the 68 element FAP frame to 7 and 9 components, respectively, prior to predictive coding.

At low bit rates, the KLT enhanced algorithm uniformly outperforms the prediction only technique by approximately 10 dB. The limited number of bits can be concentrated on the few transform coefficients instead of being distributed across all 68 elements of the FAP frame. While response curve 40 increases approximately linearly with bit rate, response curves 42 and 44 tend to flatten out. No matter how many coding bits are used, the error caused by discarding the majority of the components cannot be avoided. At these bit rates, where the intermediate quantization error is small, the PSNR can be increased by retaining additional components. As a result, the decision on whether to use dimension reduction and how many components to keep depends on the expected bit rate of a particular application.

Figure 5:
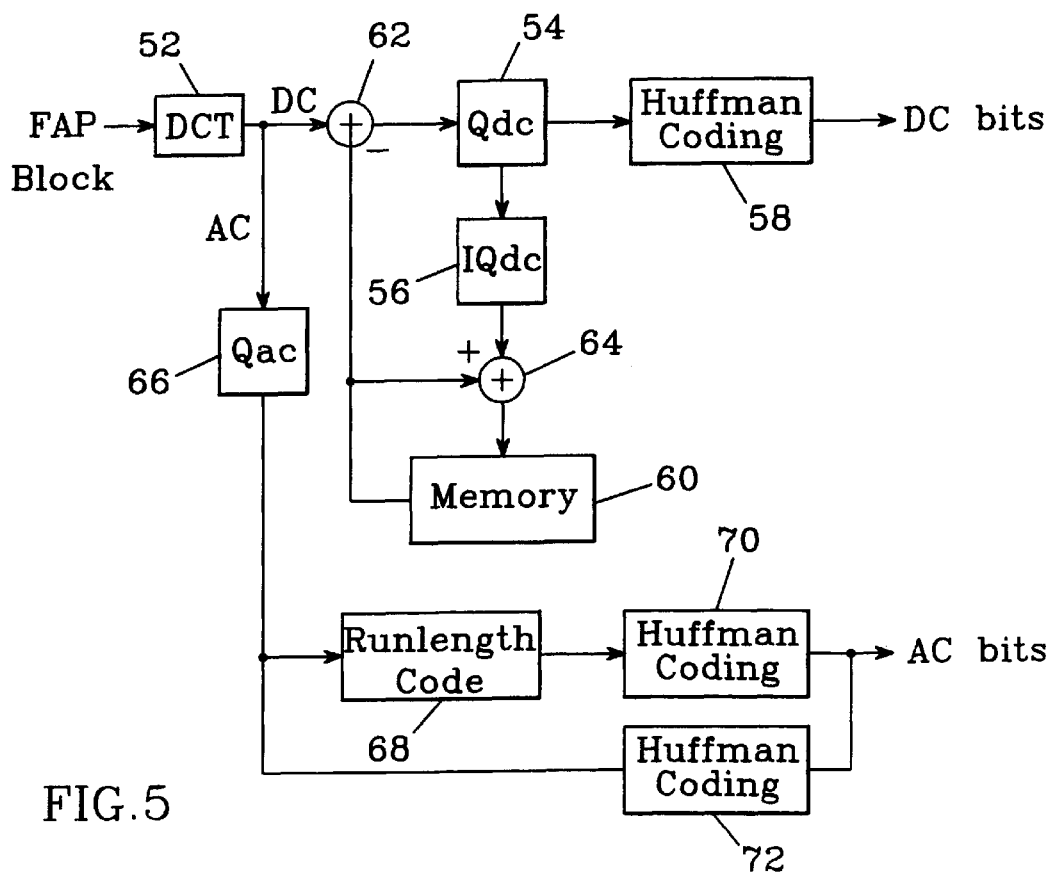
FIG. 5 is a block diagram of a preferred embodiment of the temporal reduction portion of the FAP coder.

FIG. 5 depicts a preferred transform based architecture 50 for removing the FAP sequence's inter-frame temporal correlation. In a multi talking head system, each of the m length L parameter vectors from each FAP sequence can be applied in parallel to a m FAP coders or they can be multiplexed and applied to a single FAP coder. A particular implementation will depend upon the competing hardware and coding latency requirements of a given system.

Assuming a dedicated coder, each successive parameter vector is transformed into L coefficients using, for example, a one-dimensional DCT (step 52). This compacts the signal energy into a relatively few coefficients. Coding gain is realized by predictive coding the DC coefficients from block-to-block and run-length coding the AC coefficients within each block. Since the compression of graphics content is quite different from the compression of images and video, the quantizer thresholds are preferably obtained from empirical observations, both objective and subjective, of coded talking head sequences.

For the first vector of a sequence, the DC coefficient is quantized (step 54) and entropy coded (step 56) using a Huffman or Arithmetic code. The quantized value is inverse quantized (step 58) and the reconstructed value is stored in memory (step 60). From the second vector on, the DC coefficient of the previous block is used as a predicted value of the current DC coefficient. This corresponds to a 1-step unweighted prediction code. The predicted value is subtracted from the current DC coefficient (step 62) with the residual value being quantized and entropy coded. The reconstructed residual value is then added (step 64) to the previous predicted value and stored in memory 60 to provide the next predicted value. If a single FAP coder is used to code each parameter vector in each of the multiple sequences, the predicted values must be stored and accessed in such a manner that the block-to-block prediction of DC coefficients is preserved.

The AC coefficients in the current block are quantized (step 66) and run-length coded (step 68) to indicate the number of zero values that precede the next non-zero value. A special symbol is used to indicate the last non-zero coefficient in a block. Assuming a block length of 16, the run-length code ranges from 0 to 14 with the value 15 being used to indicate the last non-zero coefficient. The run-length codes and non-zero AC coefficients are entropy coded (steps 70 and 72, respectively) using Huffman or Arithmetic codes.

Figure 6:
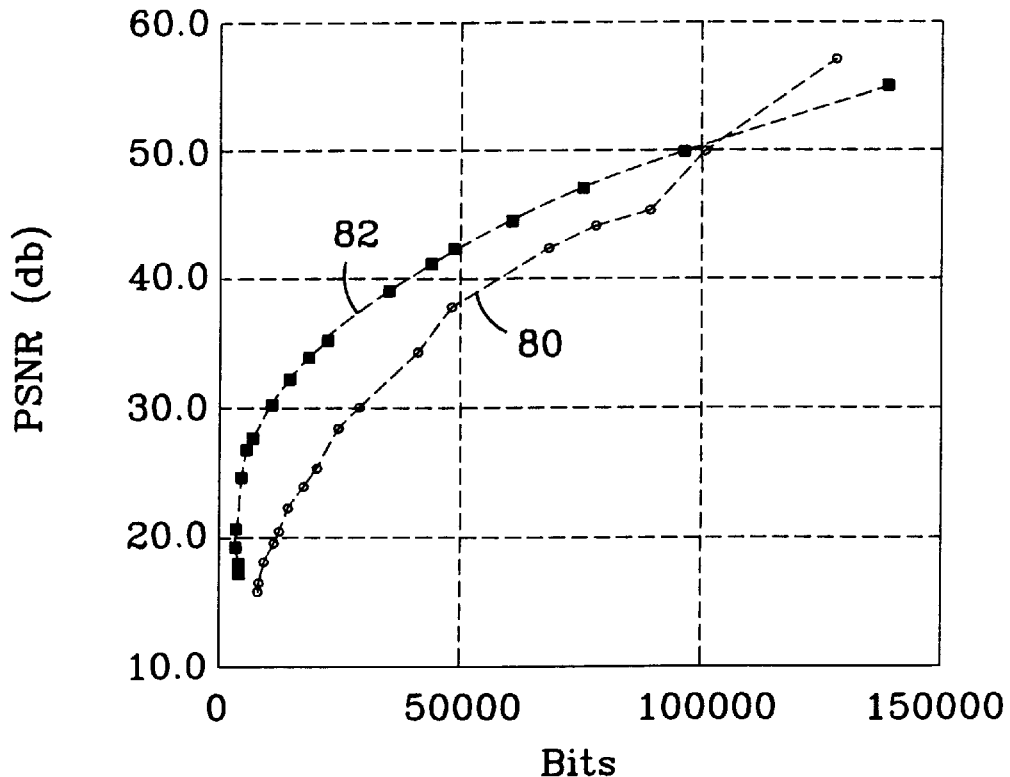
FIG. 6 is a plot illustrating the coding gain associated with using one-dimensional DCTs to reduce inter-frame correlation with dimension reduction disabled.

The coding gain achieved by replacing the predictive coding technique used in the parent application, Ser. No. 08/799,818 filed Feb. 13, 1997 and entitled "DATA COMPRESSION FOR ANIMATED THREE DIMENSIONAL OBJECTS," with the DCT based approach is illustrated in FIG. 6. For purposes of comparison, dimension reduction is disabled. The predictive coding and DCT algorithms respectively produce response curves 80 and 82 for a synthetic talking head sequence. Transform coding provides the largest performance enhancement at low bit rates. For example between PSNRs of 30 to 40 dB, the average bit-rate of the DCT algorithm is about 30–40% of the predictive coding bit-rate.

Figure 7:
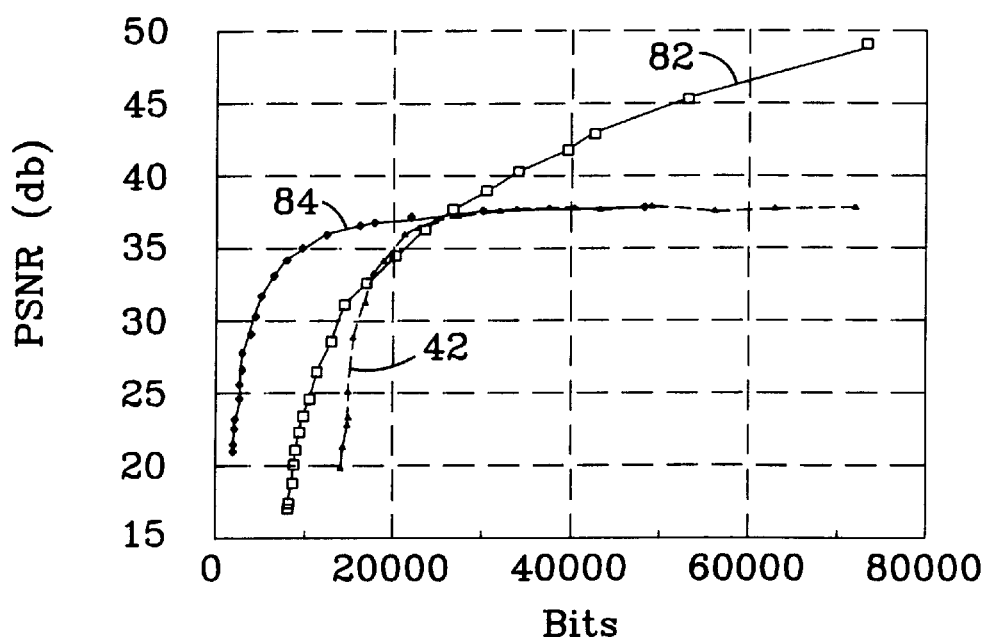
FIG. 7 is a plot illustrating the coding gain associated with using the KLT to achieve dimension reduction and one-dimensional DCTs to reduce inter-frame correlation.

The overall performance enhancement provided by reducing the dimensionality of the FAP frame using a 7 component KLT, segmenting the transformed sequence into blocks of length 16, reducing the temporal correlation using one-dimensional DCTs, predictive coding the DC coefficients and run-length coding the zero valued AC coefficients is illustrated in FIG. 7. In general, the KLT/DCT based coding technique plotted in response curve 84 provides substantial coding gain over both the KLT (response curve 42) and DCT (response curve 82) techniques at low bit rates. At a PSNR of 30 dB, the bit rate is reduced by approximately ⅓ as compared to either the KLT or DCT methods and approximately one order of magnitude as compared to prediction coding. The coding gain is approximately equally distributed between dimension reduction and improved temporal decorrelation. As compared to transmitting the FAPs uncoded, the bit rate is reduced by approximately two orders of magnitude at a PSNR of 30 dB. Although the coded FAPs are lossy, at 30 dB the errors are not perceptible in the reconstructed video signal.

While several illustrative embodiments of the invention have been shown and described, numerous variations and alternate embodiments will occur to those skilled in the art. For example, the described coding schemes can also be applied to code Body Animation Parameters (BAPs). Such variations and alternate embodiments are contemplated, and can be made without departing from the spirit and scope of the invention as defined in the appended claims.

We claim:

1. A method of coding facial animation parameters (FAPs) for synthetic video, comprising:

generating a temporal sequence of FAP frames for a synthetic video signal, each said frame representing a time sample of spatially correlated parameters in an n-dimensional space;

transforming each said FAP frame from the n-dimensional space into an m-dimensional subspace where m<n to reduce the intra-frame spatial correlation; and coding the temporal sequence of m-dimensional FAP frames into a bitstream.

2. The method of claim 1, wherein said FAP frames are transformed using a Karhunen Loeve Transform (KLT) that maps the FAP frames into the m-dimensional space in which the transformed parameters are orthogonal to each other.

3. The method of claim 1, wherein said m-dimensional subspace comprises m basis functions that each have physical meaning in the context of the synthetic video signal.

4. The method of claim 3, wherein said m basis functions are selected from a set of action units (AUs) in the facial action coding system (FACS).

5. The method of claim 1, wherein said sequence of FAP frames is subdivided into a plurality of subsequences corresponding to different groups of FAPs that exhibit strong local spatial correlation, each said subsequence being transformed into a reduced dimension subspace using a transform tailored to the corresponding FAP group to further reduce the overall intra-frame spatial correlation.

6. A method of coding facial animation parameters (FAPS) for synthetic video, comprising:
    generating a temporal sequence of FAP frames for a synthetic video signal, each said frame representing a time sample of parameters in an n-dimensional space;
    segmenting the temporal sequence into length L blocks of FAP frames to define n length L parameter vectors that exhibit significant inter-frame temporal correlation;
    transform coding each said parameter vector into L transform coefficients to reduce the inter-frame temporal correlation; and
    coding the transform coefficients into a bitstream.

7. The method of claim 6, wherein said parameter vectors are transform coded using a Discrete Cosine Transform (DCT).

8. The method of claim 6, wherein for each said parameter vector the first transform coefficient is a DC coefficient and the remaining transform coefficients are AC coefficients, each said parameter vector's transform coefficients being coded by:
    predictive coding the DC coefficients from block-to-block;
    quantizing the AC coefficients in the current block;
    run-length coding the zero valued AC coefficients; and
    entropy coding the quantized DC coefficients, quantized AC coefficients and run-length codes.

9. The method of claim 8, wherein the DC coefficients are predictive coded by:
    subtracting a predicted value from the DC coefficient to generate a residual value;
    quantizing the residual value;
    inverse quantizing the quantized residual value to generate a reconstructed residual value;
    summing the reconstructed residual value with the predicted value to generate the predicted value for the next DC coefficient.

10. The method of claim 8, wherein the coefficients are entropy coded using Huffman codes.

11. A method of coding facial animation parameters (FAPs) for synthetic video, comprising:
    generating a temporal sequence of FAP frames for a synthetic video signal, each said frame representing a time sample of parameters in an n-dimensional space;
    segmenting the temporal sequence into length L segments of FAP frames to define n length L parameter vectors that exhibit significant inter-frame temporal correlation;
    using a discrete cosine transform (DCT) to transform each said parameter vector into L transform coefficients to reduce the inter-frame temporal correlation thereby achieving a measure of coding gain, said first transform coefficient is a DC coefficient and the remaining transform coefficients are AC coefficients;
    for each said parameter vector,
        using a one-step unweighted predictive code to code and quantize the DC coefficient from block-to-block;
        quantizing the AC coefficients in the current block;
        run-length coding the zero valued AC coefficients;
        Huffman coding the quantized DC coefficients, non-zero quantized AC coefficients and the run-length codes;
    multiplexing the entropy coded DC and AC coefficients and run-length codes into a bitstream.

12. The method of claim 11, further comprising:
    transforming each said FAP frame in the temporal sequence from the n-dimensional space into an m-dimensional subspace where m<n to reduce the intra-frame spatial correlation and achieve additional coding gain, said m-dimensional sequence being segmented into m length L parameter vectors.

13. The method of claim 12, wherein said sequence of FAP frames is subdivided into a plurality of subsequences corresponding to different groups of FAPs that exhibit strong local spatial correlation, each said subsequence being transformed into a reduced dimension subspace using a transform tailored to the corresponding FAP group to further reduce the overall intra-frame spatial correlation.

14. A method of coding facial animation parameters (FAPs) for synthetic video, comprising:
    generating a temporal sequence of FAP frames for a synthetic video signal, each said frame representing a time sample of spatially correlated parameters in an n-dimensional space;
    transforming each said FAP frame from the n-dimensional space into an m-dimensional subspace where m<n to reduce the intra-frame spatial correlation and achieve a measure of coding gain;
    segmenting the temporal sequence into length L blocks of FAP frames to define m length L parameter vectors;
    transform coding each said parameter vector into L transform coefficients to reduce the inter-frame temporal correlation and achieve additional coding gain; and
    coding the transform coefficients into a bit stream.

15. The method of claim 14, wherein said FAP frames are transformed using a Karhunen Loeve Transform (KLT) that maps the FAP frames into the m-dimensional space in which the transformed parameters are orthogonal to each other.

16. The method of claim 14, wherein for each said parameter vector the first transform coefficient is a DC coefficient and the remaining transform coefficients are AC coefficients, each said parameter vector's transform coefficients being coded by:
    predictive coding the DC coefficients from block-to-block;
    quantizing the AC coefficients in the current block;
    run-length coding the zero valued AC coefficients; and
    entropy coding the quantized DC coefficients, quantized AC coefficients and run-length codes.

17. The method of claim 16, wherein the DC coefficients are predictive coded by:
    subtracting a predicted value from the DC coefficient to generate a residual value;

quantizing the residual value;

inverse quantizing the quantized residual value to generate a reconstructed residual value;

summing the reconstructed residual value with the predicted value to generate the predicted value for the next DC coefficient.

18. A method of coding facial animation parameters (FAPs) for transmitting synthetic video over a band limited channel, comprising:

generating a plurality of talking head FAP sequences for a single video signal, each said FAP frame representing a time sample of spatially correlated parameters in an n-dimensional space, the uncoded bandwidth of each said sequence being less than the bandwidth of said channel with the total uncoded bandwidth of said plurality of sequences being greater than the channel bandwidth;

transforming each said FAP frame for each said sequence from the n-dimensional space into an m-dimensional subspace where m<n to reduce the intra-frame spatial correlation and achieve a measure of coding gain;

segmenting the temporal sequence into length L blocks of FAP frames to define m length L parameter vectors;

transform coding each said parameter vector into L transform coefficients to reduce the inter-frame temporal correlation and achieve additional coding gain; and coding the transform coefficients for all said sequences into a video bitstream having a total coded bandwidth that is less than the channel bandwidth.

19. The method of claim 18, wherein said FAP frames are transformed using a Karhunen Loeve Transform (KLT) that maps the FAP frames into the m-dimensional space in which the transformed parameters are orthogonal to each other.

20. The method of claim 18, wherein said sequence of FAP frames is subdivided into a plurality of subsequences corresponding to different groups of FAPs that exhibit strong local spatial correlation, each said subsequence being transformed into a reduced dimension subspace using a transform tailored to the corresponding FAP group to further reduce the overall intra-frame spatial correlation.

21. The method of claim 18, wherein for each said parameter vector the first transform coefficient is a DC coefficient and the remaining transform coefficients are AC coefficients, each said parameter vector's transform coefficients being coded by:

predictive coding the DC coefficients from block-to-block;

quantizing the AC coefficients in the current block;

run-length coding the zero valued AC coefficients; and entropy coding the quantized DC coefficients, quantized AC coefficients and run-length codes.

22. The method of claim 21, wherein the DC coefficients are predictive coded by:

subtracting a predicted value from the DC coefficient to generate a residual value;

quantizing the residual value;

inverse quantizing the quantized residual value to generate a reconstructed residual value;

summing the reconstructed residual value with the predicted value to generate the predicted value for the next DC coefficient.

* * * * *